United States Patent
Lin et al.

(10) Patent No.: US 8,363,366 B2
(45) Date of Patent: Jan. 29, 2013

(54) ELECTROSTATIC DISCHARGE PROTECTION CIRCUIT

(75) Inventors: Po-Ching Lin, Taipei (TW); Cheng-Jui Chen, Taoyuan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 12/462,880

(22) Filed: Aug. 11, 2009

(65) Prior Publication Data

US 2010/0039743 A1 Feb. 18, 2010

(30) Foreign Application Priority Data

Aug. 14, 2008 (TW) .................................. 97130937 A

(51) Int. Cl.
*H02H 3/00* (2006.01)
*H02H 9/00* (2006.01)
*H02H 1/00* (2006.01)
*H02H 1/04* (2006.01)
*H02H 1/22* (2006.01)
*H02H 9/06* (2006.01)

(52) U.S. Cl. .......................................... 361/56; 361/118

(58) Field of Classification Search ...................... 361/56
See application file for complete search history.

(56) References Cited

U.S. PATENT DOCUMENTS

| 7,397,642 | B2 * | 7/2008 | Ker et al. .......................... 361/56 |
| 7,545,616 | B2 * | 6/2009 | Kim .................................. 361/56 |
| 2003/0011949 | A1 * | 1/2003 | Ker et al. ........................... 361/56 |
| 2006/0092590 | A1 | 5/2006 | Chuang et al. |
| 2006/0119998 | A1 | 6/2006 | Yang et al. |
| 2008/0049365 | A1 * | 2/2008 | Worley et al. .................... 361/56 |
| 2008/0283986 | A1 * | 11/2008 | Hirata ............................ 257/678 |
| 2008/0316660 | A1 * | 12/2008 | Huang et al. ..................... 361/56 |

FOREIGN PATENT DOCUMENTS
CN 1862807 11/2006

OTHER PUBLICATIONS

Ming-Dau Ker, senior member, IEEE, "Whole-Chip ESD Protection Design with Efficient VDD-to-VSS ESD Clamp Circuits for Submicron CMOS VLSI". *IEEE Transactions on Electron Devices*, vol. 46, No. 1, Jan. 1999.
CN Office Action (dated Apr. 6, 2012).

* cited by examiner

*Primary Examiner* — Dharti Patel
(74) *Attorney, Agent, or Firm* — McClure, Qualey & Rodack, LLP

(57) ABSTRACT

An electrostatic discharge (ESD) protection circuit is disclosed, which comprises an ESD detection circuit and protection switches. If an ESD event occurs, the ESD detection circuit turns off the protection switches so as to protect an application circuit provided in integrated circuits (IC) from being damaged by the electrostatic discharge, and if not, the ESD detection circuit turns on the protection switches so as to make the application circuit provided in integrated circuits (IC) function normally.

2 Claims, 1 Drawing Sheet

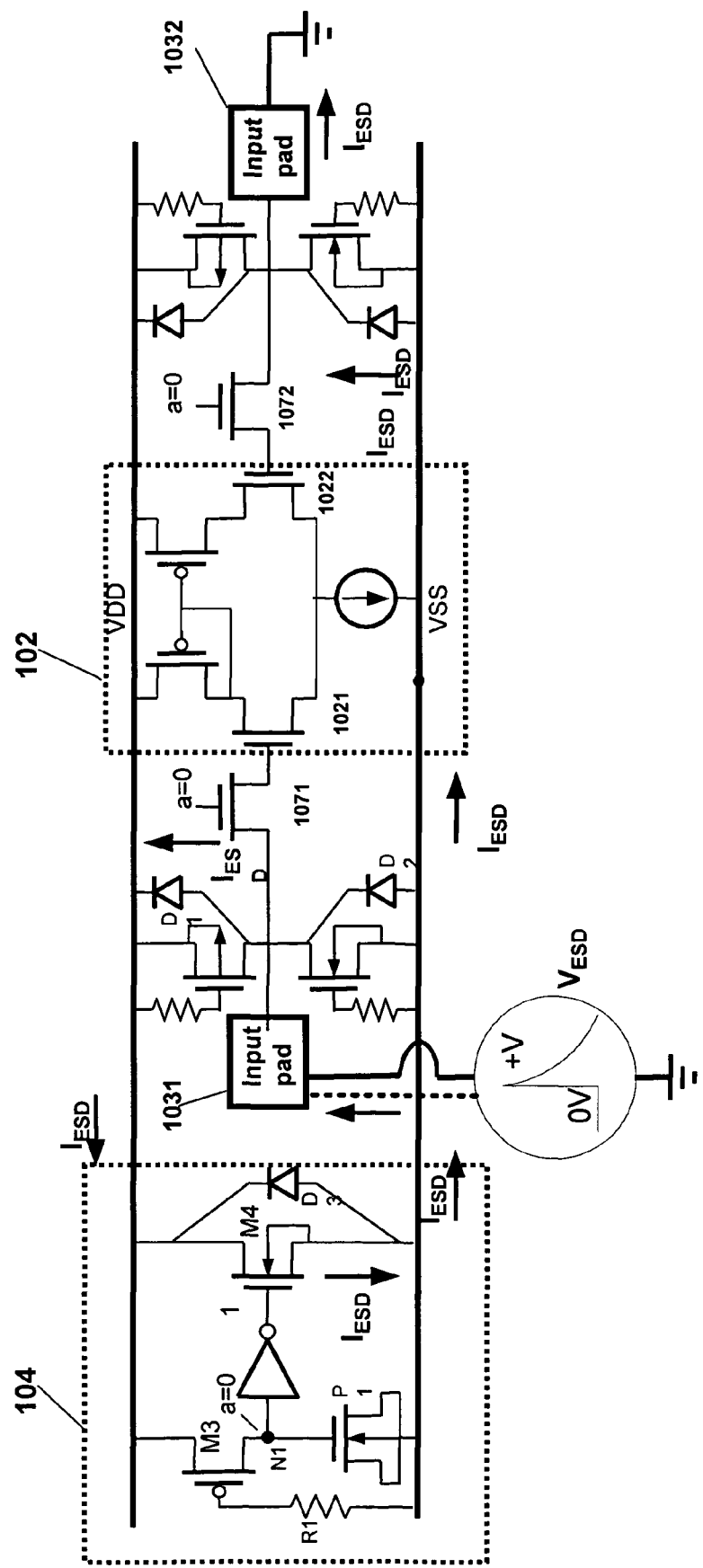

ELECTROSTATIC DISCHARGE PROTECTION CIRCUIT

BACKGROUND OF THE INVENTION

1. Field of Invention

The present invention relates to an electrostatic discharge protection circuit, and in particular, to an electrostatic discharge protection circuit provided in integrated circuits (ICs) for electrostatic discharge protection

2. Description of Related Art

In integrated circuits (IC), a plurality of devices are formed of metal oxide semiconductor (being referred to as MOS, hereinafter). However, gate oxides of such MOS devices are likely to be punched through by an abrupt high voltage caused by electrostatic discharge (being referred to as ESD, hereinafter), and a failure may be caused due to such punch-through. Therefore, it is necessary to set up in the IC an ESD protection circuit for protecting the whole IC from being damaged by external ESD.

In general, the ESD circuit eliminates electrostatic electricity by driving electrostatic electricity out of the IC in order to protect the IC from being damaged by electrostatic electricity. In other words, if an ESD event occurs, the ESD protection circuit can protect the IC from damage caused by the ESD event by means of discharging the electrostatic electricity through a path of a supply voltage VDD or VSS. However, as the microminiaturization of semiconductor process is improved, the thickness of the gate oxide of the MOS transistor is further reduced. Also, the prior art ESD protection circuits cannot protect the metal oxides of MOS transistors having reduced thickness from a high voltage environment. In such circumstances, lifetimes of MOS transistor are adversely reduced.

SUMMARY OF THE INVENTION

In view of the above, an object of the present invention is to provide an ESD protection circuit, which can protect an application circuit from an instantaneous high voltage during an ESD event but does not affect a normal operation of the application circuit if the application circuit operates in a normal state.

Also, the object of the present invention is to provide an ESD protection circuit for increasing lifetime of an application circuit.

The present invention provides an ESD protection circuit provided in integrated circuits having an input pad and an application circuit, comprising: an ESD detection circuit for detecting whether there is an ESD event occurred at the input pad, and outputting a detection signal based on the detection; and a protection switch being coupled between the input pad and the application circuit, and being turned on/off based on the detection signal, wherein the protection switch is turned off by the detection signal so as to disconnect the input pad from the application circuit when the ESD event occurs, and the protection switch is turned on by the detection signal so as to form a short circuit between the input pad and the application circuit when no ESD event occurs.

BRIEF DESCRIPTION OF THE DRAWINGS

These and other features, aspects, and advantages of the present invention will become more apparent from the following description of the embodiments of the present invention, with reference to accompanying drawings, in which FIG. 1 illustrates a schematic circuit diagram of an ESD protection circuit according to an embodiment of the present invention and an application in which it is provided in integrated circuits.

DESCRIPTION OF THE PREFERRED EMBODIMENTS

The embodiment according to the present invention will be described, with reference to FIG. 1. FIG. 1 illustrates a schematic circuit diagram of an ESD protection circuit according to the embodiment of the present invention. As shown in FIG. 1, integrated circuits 100 include an application circuit 102, a plurality of input pads 1031 to 103n (only two pads are shown in the figure), an electrostatic discharge (ESD) detection circuit 104, and a plurality of protection switches 1071 to 107n (only two switches are shown in the figure). The ESD detection circuit 104 and the plurality of protection switches 1071 to 107n form the ESD protection circuit. For purpose of clarity, only two input pads 1031 and 1032 and only two protection switches 1071 and 1072 are given as examples for explanations.

In general, each of the input pads 1031 to 1032 is coupled to the ESD detection circuit 104 via a discharging circuit formed by a diode and a transistor. Normally, the detection circuit 104 includes a discharge circuit and a detection circuit. Here, the discharge circuit corresponds to an NMOS transistor M4 and a diode D3, and the detection circuit is mainly formed by a PMOS transistor M3, a resistor R1 coupled to the transistor M3, and a capacitor P1 coupled to a node N1, as shown in FIG. 1. According to the embodiment of this invention, for example, the capacitor P1 may be implemented with a transistor. It should be noted that coupling relations among all of the elements of the detection circuit 104 are clearly illustrated in FIG. 1 and their associated descriptions will be omitted here. In addition, the ESD detection circuit 104 may be implemented in various forms, and this invention is not limited to the detection circuit 104 illustrated in FIG. 1.

As illustrated in FIG. 1, the protection switches 1071 and 1072 are implemented with MOS transistors. If NMOS transistors are used as the protection switch 1071 and 1072, a drain of the NMOS transistor 1071 is coupled to the input pad 1031 and a source of the NMOS transistor 1071 is coupled to a gate of an MOS transistor 1021 in the application circuit 102, a drain of the NMOS transistor 1072 is coupled to the input pad 1032 and a source of the NMOS transistor 1072 is coupled to a gate of an MOS transistor 1022 in the application circuit 102, and gates of the NMOS transistors 1071 and 1072 receive a detection signal a from the ESD detection circuit 104.

When the detection signal is equal to 0 (low level), the protection switches 1071 and 1072 are in a high resistance state or form an open circuit, and accordingly isolate the application circuit 102 from signals input from input pads. When the detection signal a is equal to 1 (high level), the protection switches 1071 and 1072 are in a conductive state or form a short circuit, and accordingly couple the application circuit 102 to the input pads. Here, since the NMOS transistors are used as the protection switches 1071 and 1072, the MOS transistors in the open circuit state can function as resistors having resistance about 100 MΩ or higher.

Next, an operation relation between the detection signal a generated by the ESD detection circuit 104 and the protection switches 1071 to 107n during an ESD event is further explained.

During the ESD event, if the electrostatic voltage $V_{ESD}$ applied to the input pad 1031 is a positive voltage, the diode D1 coupled to the input pad can be conducted and therefore static charges can flow to the ground voltage VSS through the transistor M4 in the detection circuit 104. Such electrostatic discharging route is indicated by a dash line with an arrow $I_{ESD}$ in FIG. 1.

According to this invention, since the detection signal a output from the node N1 is logic 0 when the ESD event is occurred, the gate of the transistor M4 receives a signal (logic 1) inverted to the detection signal a and thus is conducted to make the ESD operation executed. At the same time, the protection switches 1071 and 1072 receive the detection signal a (logic 0) so as to be kept in the open circuit state, and accordingly function as resistors having high resistance between the input pad 1031 and the application circuit 102. Thus, the application circuit 102 can be protected from being affected by the static electricity. After the static electricity is discharged through the transistor M4, the transistor M3 is conducted, the node N1 becomes to be in logic 1, and the protection switches are conducted so as to be in a short circuit state. Therefore, the application circuit 102 can normally receive the input signals from the input pads 1031 and 1032.

Although one MOS transistor is used as the protection switch, this invention is not limited to this. For example, the protection switch may be formed by a plurality of transistors, which may be connected in series or in parallel. In addition, the application circuit 102 may be an analog circuit or a digital circuit, and this invention is not limited to the circuit shown in FIG. 1.

According to this invention, since the detection signal a output from the node N1 is logic 0 when the ESD event has occurred, the gate of the transistor M4 receives a signal (logic 1) inverted to the detection signal and thus is conducted to make the ESD operation executed. At the same time, the protection switches 1071 and 1072 receive the detection signal a (logic 0) so as to be kept in the open circuit state, and accordingly function as resistors having high resistance between the input pad 1031 and the application circuit 102. Thus, the application circuit 102 can be protected from being affected by the static electricity. After the static electricity is discharged through the transistor M4, the transistor M3 is conducted, the node N1 becomes to be in logic 1, and the protection switches are conducted so as to be in a short circuit state. Therefore, the application circuit 102 can normally receive the input signals from the input pads 1031 and 1032.

While the present invention has been described with reference to exemplary embodiments, this invention is not limited to the specific details disclosed in the above. Therefore, various changes, modifications, alternatives, etc. may be made by those skilled in this art without departing the spirits of the present invention and the scope defined by the appended claims and their equivalents.

What is claimed is:

1. An electrostatic discharge protection circuit implemented in an integrated circuit with an application circuit, comprising:
   a plurality of input pads;
   an electrostatic discharge detection circuit configured to detect an electrostatic discharge event at any of the plurality of input pads, the electrostatic discharge detection circuit further configured to output a detection signal based on detection of an electrostatic event, wherein each of the plurality of input pads is coupled to the electrostatic discharge detection circuit; and
   a plurality of protection switches, wherein each protection switch is coupled between a corresponding input pad and the application circuit such that each protection switch provides one of an open circuit and a short circuit in a path between the corresponding input pad and the application circuit, wherein each of the plurality protection switches is configured to operate independently of the other protection switches.

2. The electrostatic discharge protection circuit of claim 1, wherein each of the plurality of protection switches is implemented with NMOS transistors.

* * * * *